United States Patent [19]

Kim

[11] Patent Number: 4,478,780

[45] Date of Patent: Oct. 23, 1984

[54] CONVERGENT HOT CONE PROCESS FOR THERMOSET MOLDING

[75] Inventor: Wontaik Kim, Clifton Park, N.Y.

[73] Assignee: General Electric Company, Schenectady, N.Y.

[21] Appl. No.: 463,351

[22] Filed: Feb. 1, 1983

Related U.S. Application Data

[63] Continuation of Ser. No. 329,444, Dec. 10, 1981, abandoned.

[51] Int. Cl.³ .................................................. B29F 1/00
[52] U.S. Cl. .............................. 264/328.2; 264/328.6; 425/543; 425/549
[58] Field of Search .............................. 425/543, 549; 264/328.2, 328.6, 328.17, 349

[56] References Cited

U.S. PATENT DOCUMENTS 2,658,237 11/1953 Cuppett ........................ 425/549 X
4,370,115 1/1983 Miura ............................. 425/543 X Primary Examiner—Donald Czaja
Assistant Examiner—Fischbach V.
Attorney, Agent, or Firm—Lawrence D. Cutter; James C. Davis, Jr.; Marvin Snyder

[57] ABSTRACT

An inverted cone is disposed in a housing having a complementarily-shaped conical portion into which the cone is introduced. Means are provided for introducing thermoset plastic material to be heated, into the housing at the base end of the cone so that the material flows through the region defined between the cone and the housing. Means are provided for heating the region between the cone and the housing and for removing the heated plastic material from near the tip of the cone. There is also preferably provided a mixing chamber near the tip of the cone to ensure uniform thermal and mechanical mixture of the plastic material. The present invention provides uniform heating of the material being processed.

5 Claims, 2 Drawing Figures

CONVERGENT HOT CONE PROCESS FOR THERMOSET MOLDING

The present application is a continuation of application Ser. No. 329,444 filed Dec. 10, 1981 now abandoned.

BACKGROUND OF THE INVENTION

The present invention relates to a method for heat curing of thermoset plastic materials and, in particular, to an apparatus which provides a uniformly heated and mixed thermoset plastic material for introduction into molds.

Raw thermoset plastic material is a particularly important ingredient in the manufacture of many molded plastic objects. During the manufacture of such objects, it is necessary to raise the temperature of the raw thermoset material to its cure temperature prior to its introduction into variously-shaped molds. However, one of the problems often encountered during manufacture of such articles involves control of the thermal and mechanical uniformity of the thermoset plastic mix. Homogeneous solidification is highly desirable to ensure internal structural uniformity and rugged mechanical properties for the molded article. It is, nonetheless, difficult to ensure thermal uniformity in plastic materials such as the ones contemplated for use in the present invention, because of the low thermal conductivity of raw thermoset plastic material. Accordingly, conventional methods employed to raise the barrel temperature of thermoset materials by conventional conductive means is neither energy efficient nor productive because of its low thermal conductivity.

Since the thermoset plastic material is characterized by a reduced viscosity at higher temperatures until cross-linking causes the viscosity to increase, raising the material temperature at the vicinity of the injection mold cavity is still quite desirable, however, so as to shorten the residence time of the high temperature melt in flow passages prior to its injection into various mold cavities. Under these higher temperature conditions, the melt viscosity is reduced to allow easier filling of the mold with reduced air entrapment before cross-linking causes the viscosity to increase.

In the past, one method of alleviating some of the above-mentioned problems encountered during the processing of thermoset plastic material, was the use of a divergent hot cone system. In this system, a flowing layer of plastic material is forced to flow between a heated cone and the walls of a corresponding complementarily-shaped housing wall. In this system, two modes of material heating are employed. In particular, external heaters are employed but, additionally, the material is heated frictionally by means of viscous drag forces. However, the divergent cone system introduces the thermoset plastic material at the cone tip, rather than at its base as is taught herein. Such systems as are taught herein may be generally classified as convergent hot cone systems for thermoset plastic molding processes. While divergent systems produce highly satisfactory products, improvements in homogeneity are nonetheless possible.

It is noted that if poor mixing occurs before the thermoset melt flows through the runners to the molds, the polymer melt far from the runner inlets can acquire a different "memory" of temperature and stress than the material near to the runner inlets. Therefore, melt with different memory may flow through the runners. This kind of flow situation is not desirable for molded article properties. Homogeneous solidification is a highly desirable factor for control of internal structural uniformity and rugged mechanical properties in the molded article.

Additionally, there are a wide variety of different thermoset materials which may be employed. A thermoset plastic material curing system should therefore be adaptable to process materials exhibiting a variety of temperature-viscosity profiles. In conventional divergent hot cone systems, the amount of viscous heating is predetermined by the fixed spacing between the male cone and its female counterpart in the housing itself. Accordingly, such fixed cone systems cannot accommodate a wide range of materials requiring different cure temperatures.

Furthermore, thermoset plastic materials exhibit a reduced viscosity at higher temperatures until cross-linking causes the viscosity to increase. Thus, raising the material temperature at the vicinity of the injection mold cavity is desirable to shorten the residence time of the high temperature melt in flow passages prior to injection into the mold cavity. Under these conditions, the melt viscosity reduction allows easier filling of the mold with less air entrapment prior to the occurrence of cross-linking which causes the viscosity of the material to increase. However, it is equally desirable for energy conservation reasons not to increase the melt temperature significantly beyond the cure temperature of the material being processed.

In short, it is desirable to quickly but uniformly heat large quantities of thermoset plastic material to a fixed temperature prior to injection of this material into molds. Moreover, it is particularly desirable that this heating occur uniformly throughout the thermoset melt and that it be delivered to the mold cavities in a condition of reduced viscosity. Moreover, it is desirous to have a system which is utilizable for a number of different thermoset plastic materials exhibiting a variety of cure temperatures. It is also desirable to ensure a homogeneous thermal and mechanical melt.

SUMMARY OF THE INVENTION

In accordance with a preferred embodiment of the present invention, a convergent hot cone heating process for a thermoset plastic employs a male cone having a tip end and a base end and a housing into which the cone is disposed, the housing having a complementary-shaped female conical portion for receiving the cone. In the present invention, the cone is movable in a direction parallel to the axis of the cone to accommodate a number of different thermoset materials exhibiting different cure temperatures. Additionally, the apparatus of the present invention includes means for heating the region between the cone and the housing and means for introducing, under pressure, thermoset plastic material at the base end of the cone so that the thermoset material flows into the region between the cone and the housing and exits from the tip end of the cone. In one embodiment of the present invention, the apparatus also includes a mixing chamber within the housing at the tip end of the cone so as to enhance thermal and material homogeneity.

Accordingly, it is an object of the present invention to provide a heating apparatus for thermoset plastic materials.

It is a further object of the present invention to provide such an apparatus which exhibits a high degree of melt homogeneity and temperature stability.

Additionally, it is an object of the present invention to provide a heating apparatus for thermoset plastic materials which is readily adaptable for processing a number of different materials having different cure temperatures.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
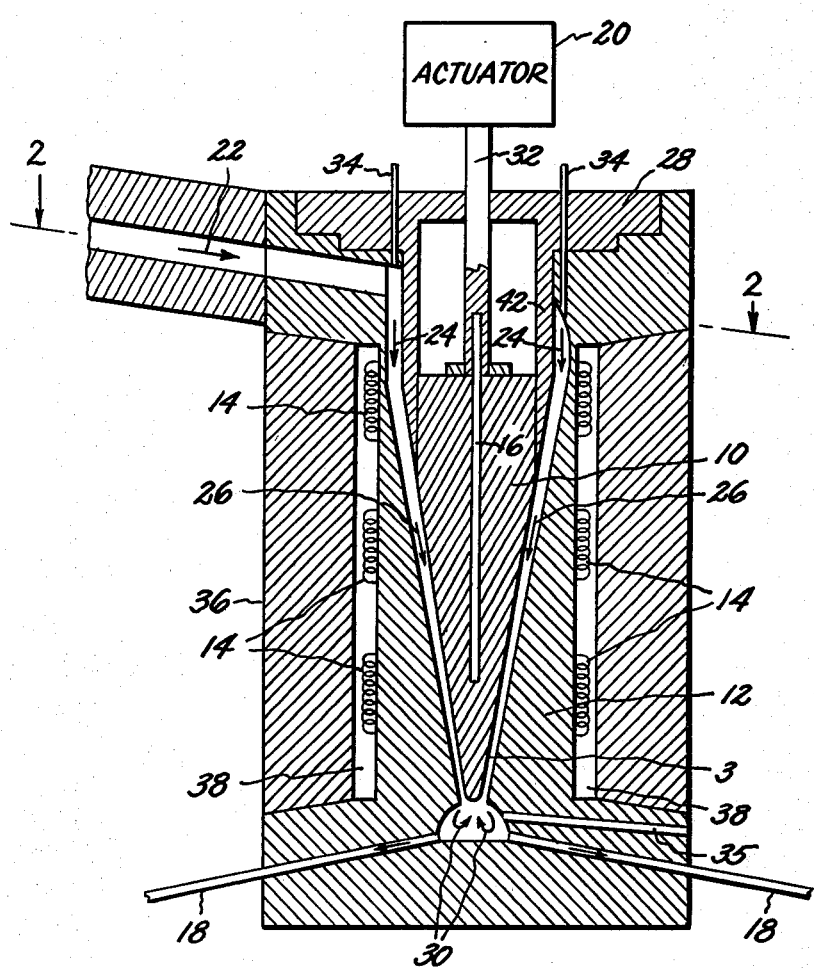
FIG. 1 is a cross-sectional view of a convergent hot cone system in accordance with the present invention.

A significant feature of the present invention is that it is a convergent hot cone apparatus. As can be seen from the flow arrows shown in FIG. 1, thermoset material is injected into the top portion of the apparatus, under pressure, and passes over the heated surfaces of male cone 10 and matching female cone portion 12 in housing casing 36. The flow then converges beneath the tip of cone 10 in mixing chamber 30. Another significant feature of the present invention shown in FIG. 1 is the fact that cone 10 is movable in a direction parallel to the axis of the cone through the action of actuator 20 which is connected to cone 10 by shaft 32.

By decreasing the gap between male cone 10 and female cone portion 12, the amount of viscous heating supplied to the thermoset material adjacent to these conical surfaces is increased. Accordingly, a smaller gap in this region is desirable for those thermoset materials having a relatively high cure temperature. For thermoset materials having a low cure temperature, actuator 20 positions cone 10 in a position somewhat more withdrawn from female cone portion 12 so as to provide a larger annular gap between the two conical surfaces. In this case, the amount of viscous heating is reduced. Thus, in this way, the apparatus of the present invention is employable for processing many different thermoset plastic materials. It is not limited to materials exhibiting a single cure temperature or a limited range of viscosities. To provide the desired axial adjustability to cone 10, it is disposed within cylindrical shell 42 having a tapered lower portion and attached to casing lid 28. Cone 10 is slidable within cylindrical shell 42 which depends from lid 28. Shaft 32 is likewise disposed through lid 28, as shown.

Actuator 20 need not be designed to generate large forces to move cone 10. More particularly, it is seen that viscous heating from the flow of thermoset plastic material is driven by the pressure in inlet conduit 22. This pressure produces two effects. First of all, it produces a fluid pressure within the thermal plastic melt which acts on cone 10 in an upward direction. However, drag forces tend to act on cone 10 so as to move it in a downward position. These counterbalancing forces, accordingly, aid in the operation of actuator 20. Thus the actuator 20 need only have small power requirements to control the annular gap thickness. Ejector pins 34 are provided to remove scrap at the end of the molding cycle.

To provide the desired heating of the thermoset plastic material, a heater such as cartridge heater 16 may be disposed in, and preferably along, the axis of cone 10, as shown. Additionally, band heaters 14 may be disposed within cylindrical gap 38 in housing 36 so as to surround female cone portion 12. Housing casings 36, together with male cone 10 and female cone portion 12 preferably comprise a metallic material having high thermal conductivity together with non-reactivity for the material being possessed. Additionally, to measure the temperature of a melt, thermal sensor 35 may be employed and disposed as shown at the wall of mixing chamber 30.

Figure 2:
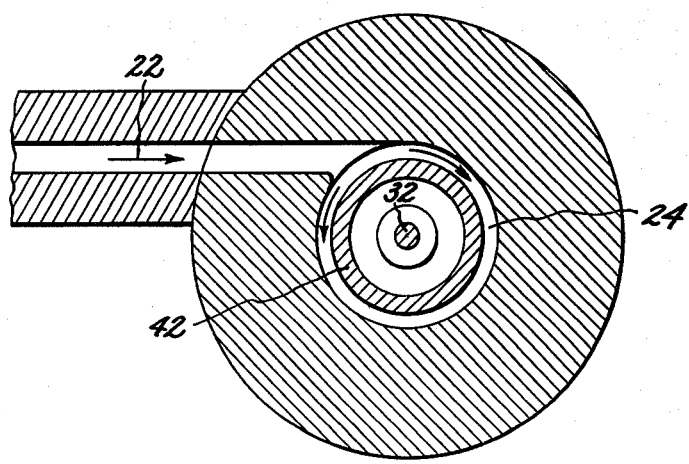
FIG. 2 is a plan view illustrating the tangential flow of thermoset plastic material into the top annular portion of the apparatus of FIG. 1.

From FIG. 2 it is seen that raw thermoset plastic material is introduced into the apparatus through inlet 22 upon which it enters annular portion 24 and thence flows down through gap 26 between conical portions 10 and 12. From there, the melt, heated to its cure temperature, is introduced, at the tip of cone 10, into mixing chamber 30. This chamber is an important feature of the present invention in that it provides a measure of thermal and mechanical homogeneity not previously found in hot cone systems and methods. It is not a feature which is found on divergent hot cone systems. The desirability and consequences of mix homogeneity are discussed above. From mixing chamber 30, melt is introduced into runners 18 which extend to the specific mold cavities desired.

The present invention exhibits outstanding features not found in other thermoset molding systems. These features are in addition to the advantages listed above concerning adjustability and the presence of mixing chamber 30. More particularly, the present invention provides a continuously accelerating system. The polymer melt in the apparatus is continuously accelerated. Since the faster rate of viscous heat generation occurs near the entrance region of the concentric cylinder than in the downstream region, the continuously accelerating convergent annular flow may be regarded as the accumulation of entrance regions exhibiting a high rate of viscous generation. Additionally, the required injection pressure rise in order to produce the accelerating annular flow is offset by reduced drag due to the low viscosity of the higher temperature melt. Moreover, as indicated, the actuator power requirements are minimal. Lastly, mixing chamber 30 provides for mixing at the apex zone of the cone so as to minimize any significant temperature differences in the melt flow. Therefore, a more homogeneous polymer melt is provided to runners 18, thus enhancing final product uniformity.

With respect to the specific design requirements of the present system, it is to be noted that the desired angle of the side feeding is shown in FIG. 2 and is such that the pressure drop is minimized while providing smooth filling in annulus region 24. The axial length of the annular region 24 is such that the small nonuniformities of stress introduced by unsymmetrical flow into the beginning of the section is circumferentially uniformly distributed as the flow approaches the conical gap region 26. It is this cone annular region 26 in which the major viscous dissipation heat generation occurs. Mixing chamber 30 preferably possesses a shape so as to accomodate swelling phenomena occurring in such thermoset melts and further to promote mixing before melt flow into runners 18.

Heat is provided to the melt particularly in the annular conical gap region 26 by means of optional cartridge heater 16 and band heaters 14. Additionally, it is to be noted that cylindrical gap 38 in housing casing 36 provides a measure of insulation so that more generated heat is supplied to the melt as it passes through gap region 26. Accordingly, the present invention exhibits increased energy efficiency.

From the above it may be appreciated that the present invention provides a thermoset plastic heating apparatus offering several advantages not heretofore found in prior art devices for such material. In particular, it is seen that the present invention provides for adjustability of the gap between the conical surfaces so that the apparatus may be employed with a number of different thermoset plastic materials. These materials may be different, both with respect to cure temperature and viscosity. Moreover, the present invention provides for a convergent hot cone system which preferably operates in a cone tip down position and, accordingly, is capable of providing a mixing chamber at the cone tip to ensure more uniform mixing of the thermoset melt. The adjustability of the cone in the present system provides just the right amount of viscous heating for the melt material. It is this viscous heating which is most desirable in the present invention since it tends to result in the most uniform temperature profiles. Accordingly, the amount of heat energy supplied to the melt may be selectively chosen to favor either supply of heat energy from external heaters or from the dissipative viscous flow itself.

While the invention has been described in detail herein, in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for curing thermoset plastic materials comprising:
   introducing the thermoset material under pressure into a region between a conical male member and complementarily-shaped female conical member in which male member is disposed so as to define said region therebetween, said introduction occuring at the base end of said conical members, so as to cause said material to flow toward the tip region defined by said conical members;
   supplying heat to the volume between said conical members to as to heat said thermoset material to its cure temperature; and
   introducing said thermoset material from said tip region into an adjacently disposed mixing chamber, so as to enhance the thermal and material homogeneity of said thermoset plastic.

2. The method of claim 1 in which said conical members are disposed in a downward direction.

3. The method of claim 1 in which said male conical member and said female conical member are heated independently.

4. The method of claim 1 in which conduit means are employed for removing heat cured thermoset plastic material from said mixing chamber.

5. The method of claim 1 in which the spacing between said conical male member and said complementarily-shaped conical female member is adjusted to match the viscosity of the thermoset plastic material.

* * * * *